(12) United States Patent
Nishizawa (10) Patent No.: US 7,681,797 B2
(45) Date of Patent: Mar. 23, 2010

(54) IMAGE PROCESSING APPARATUS, METHOD FOR CONTROLLING THE SAME, PROGRAM, AND STORAGE MEDIUM

(75) Inventor: Ayako Nishizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 11/871,836

(22) Filed: Oct. 12, 2007

(65) Prior Publication Data

US 2008/0149724 A1 Jun. 26, 2008

(51) Int. Cl.
*G06K 7/10* (2006.01)

(52) U.S. Cl. ............................. 235/462.11; 235/462.25

(58) Field of Classification Search ............ 235/462.11, 235/462.1, 462.15, 462.24, 462.25
See application file for complete search history.

(56) References Cited

U.S. PATENT DOCUMENTS

| | | | |
|---|---|---|---|
| 6,007,261 A * | 12/1999 | Fujita et al. | 400/61 |
| 6,070,800 A * | 6/2000 | Fujita et al. | 235/462.11 |
| 6,073,850 A * | 6/2000 | Tani et al. | 235/462.28 |
| 6,426,805 B1 * | 7/2002 | Imai et al. | 358/468 |
| 7,089,270 B2 * | 8/2006 | Ren et al. | 707/203 |
| 7,395,340 B2 * | 7/2008 | Fujiki | 709/229 |
| 2003/0179399 A1 | 9/2003 | Masunoshita | |

FOREIGN PATENT DOCUMENTS

| | | |
|---|---|---|
| JP | 10-312447 A | 11/1998 |
| JP | 2003-280469 A | 10/2003 |
| JP | 2004-265384 A | 9/2004 |
| JP | 2006-262078 A | 9/2006 |

* cited by examiner

*Primary Examiner*—Daniel St.Cyr
(74) *Attorney, Agent, or Firm*—Canon U.S.A. Inc., I.P. Division (57) ABSTRACT

One type of code that cannot be decoded in a certain apparatus is converted into another type of code that can be decoded in the certain apparatus. More specifically, a first type of code in an image obtained by reading a sheet including the first type of code is decoded to obtain information. The information is encoded to form a second type of two-dimensional code.

9 Claims, 5 Drawing Sheets

IMAGE PROCESSING APPARATUS, METHOD FOR CONTROLLING THE SAME, PROGRAM, AND STORAGE MEDIUM

BACKGROUND OF THE INVENTION

1. Field of the Invention

The present invention relates to an image processing apparatus for replacing a certain code with a code in a different format, a method for controlling the same, a program, and a storage medium.

2. Description of the Related Art

Japanese Patent Laid-Open No. 10-312447 discloses the QR Code™.

Japanese Patent Laid-Open No. 2003-280469 discloses the Glyph Code™. The Glyph Code includes "/" and "\". "/" indicates information "1" and "\" indicates information "0". Information which can be decoded in a decoding apparatus supporting the Glyph Code is expressed by printing dots to form the shapes of "/" or "\" on paper.

The Glyph Code disclosed in Japanese Patent Laid-Open No. 2003-280469 has a disadvantage in that the Glyph Code is less generally used than the QR Code disclosed in Japanese Patent Laid-Open No. 10-312447. On the other hand, the Glyph Code has an advantage in that the quantity of information per unit area is large. Herein, the Glyph Code is referred to as a "large-quantity special code", and the QR Code is referred to as a "small-quantity general code".

In a case in which one person provides information represented as a large-quantity special code on a printed matter, it is highly probable that another person who receives the printed matter cannot extract the information from the printed matter.

This occurs because an apparatus for decoding a large-quantity special code is not commonly available.

Thus, it is desirable that one code that cannot be decoded in a certain apparatus be converted to another type of code that can be decoded in the certain apparatus.

SUMMARY OF THE INVENTION

An image processing apparatus according to an aspect of the present invention includes a decoding unit, a transmitting unit, and an encoding unit. The decoding unit is configured to obtain information by decoding a first type of two-dimensional code in an image obtained by reading a sheet including the first type of two-dimensional code. The transmitting unit is configured to transmit a storage instruction for the information obtained by the decoding unit to a server. The encoding unit is configured to form a second type of two-dimensional code by encoding information regarding a location in which the information is stored. The second type of two-dimensional code is different from the first type of two-dimensional code, and the information regarding the location is received from the server.

Further features of the present invention will become apparent from the following description of exemplary embodiments with reference to the attached drawings.

DESCRIPTION OF THE EMBODIMENTS

Embodiments according to the present invention will now be described with reference to the accompanying drawings.

First Embodiment

Figure 1:
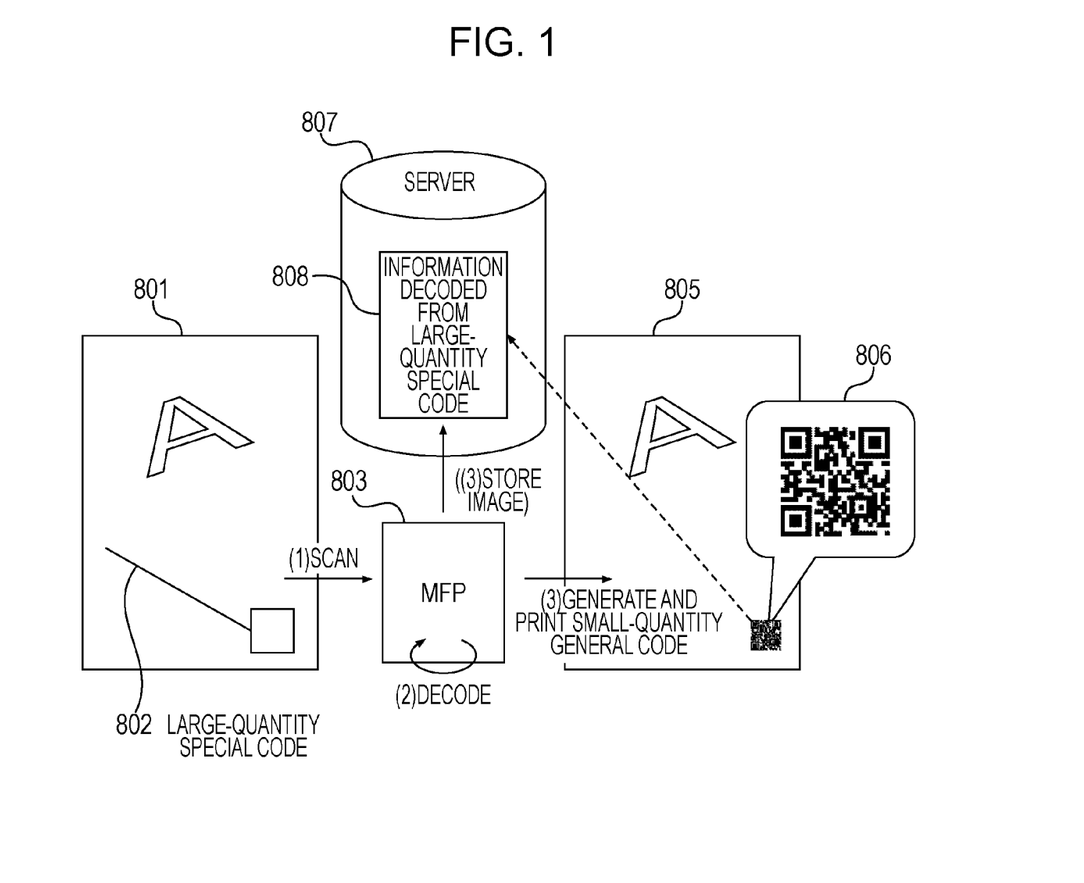
FIG. 1 is a block diagram showing a system according to an embodiment of the present invention.

FIG. 1 is a block diagram showing a system according to a first embodiment of the present invention. The system in the first embodiment includes a server 807 and a multifunction printer (MFP) 803.

An original document 801 has a large-quantity special code 802 and an image "A". The MFP 803 scans the original document 801, and decodes the large-quantity special code 802.

After that, the MFP 803 determines which of processes (1) and (2) should be performed on the basis of the decoded information, and performs one of the processes (1) and (2):

(1) the MFP 803 stores decoded information 808 in the server 807, and two-dimensionally encodes a link showing a storage location of the decoded information 808 in the server 807 to form a small-quantity general code 806 (two-dimensional code). A process for forming a two-dimensional code in the first embodiment is referred to as two-dimensional encoding. The two-dimensional code may be an image known as a two-dimensional code, such as a QR Code. The two-dimensional code may also be an image having the same advantage as a two-dimensional code, for example, a watermark or a steganographic image, though the image is not referred to as a two-dimensional code; and (2) the MFP 803 encodes the decoded information 808 to form the small-quantity general code 806 without storing the decoded information 808 in the server 807.

After the completion of the process (1) or (2), the MFP 803 places the small-quantity general code 806 in a region having been occupied by the large-quantity special code 802 in the original document 801, and prints out the resulting image on a sheet. Accordingly, the image other than the large-quantity special code 802 in the original document 801, for example, "A", and the small-quantity general code 806 are included in a printed output 805 such that the image and the small-quantity general code 806 do not overlap each other.

Figure 2:
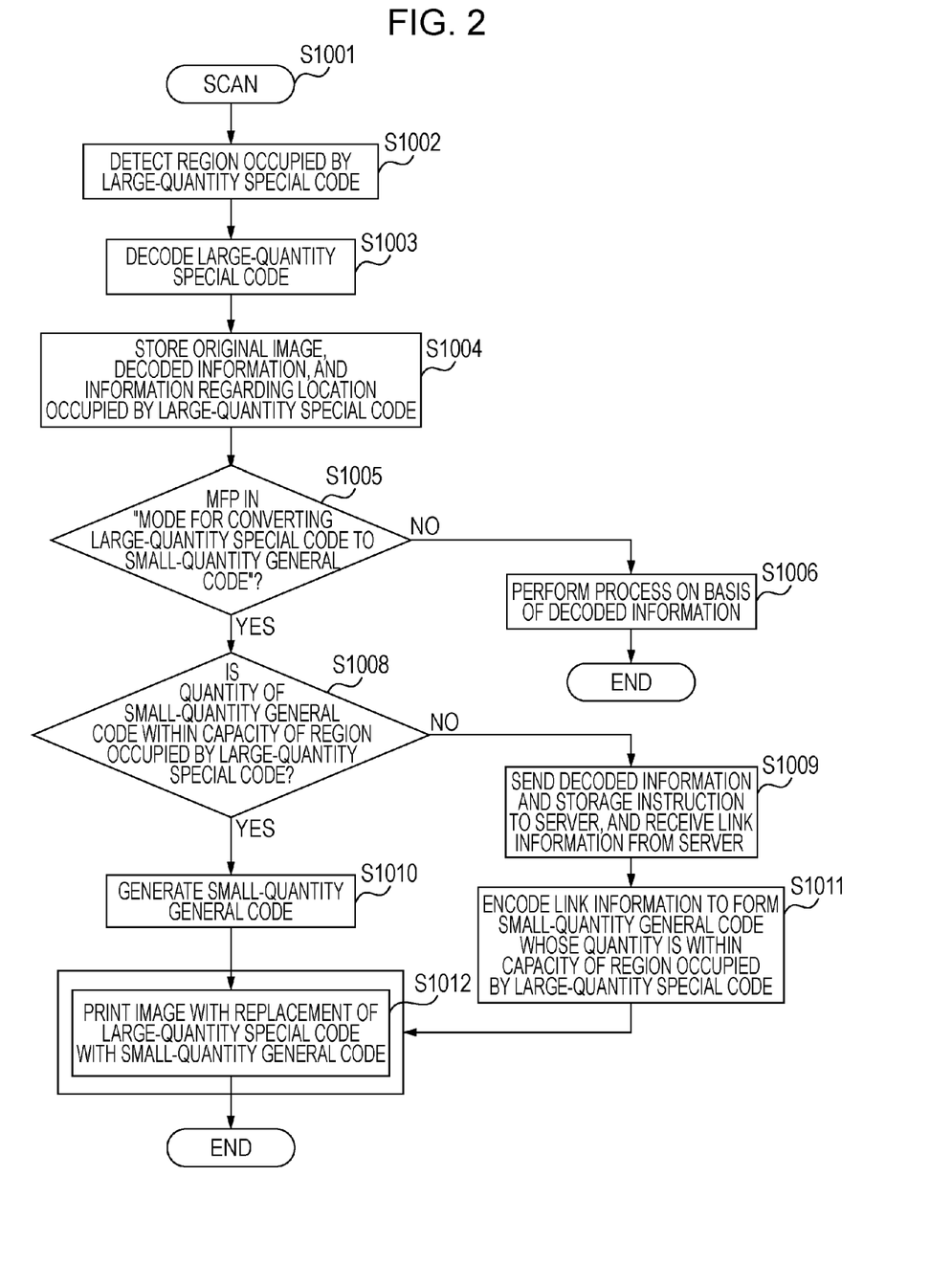
FIG. 2 is a flowchart according to a first embodiment of the present invention.

Flowchart According to First Embodiment (FIG. 2)

A flowchart of processing according to the first embodiment will now be described with reference to FIG. 2.

The MFP 803 accepts a user selection of "mode in which a large-quantity special code is converted to a small-quantity general code" on an operation screen. In response to the acceptance, the MFP 803 can accept a user selection of a start button displayed on the operation screen.

FIG. 2 shows a process that is started when the MFP 803 has accepted the user selection of the start button displayed on the operation screen. A central processing unit (CPU) in the MFP 803 has control over processing in each step in the flowchart shown in FIG. 2.

In step S1001, the CPU scans an original document on an original plate to generate electric signals representing an original image.

In step S1002, the CPU detects the region occupied by the large-quantity special code included in the original image, in particular, positions of four corners of the region occupied by the large-quantity special code, and then proceeds to step S1003. In step S1003, the CPU decodes the large-quantity special code, and then proceeds to step S1004. In step S1002 or S1003, when the CPU cannot detect or decode the large-quantity special code, the MFP 803 displays an error message on the operation screen on an as-needed basis.

Figure 4A:
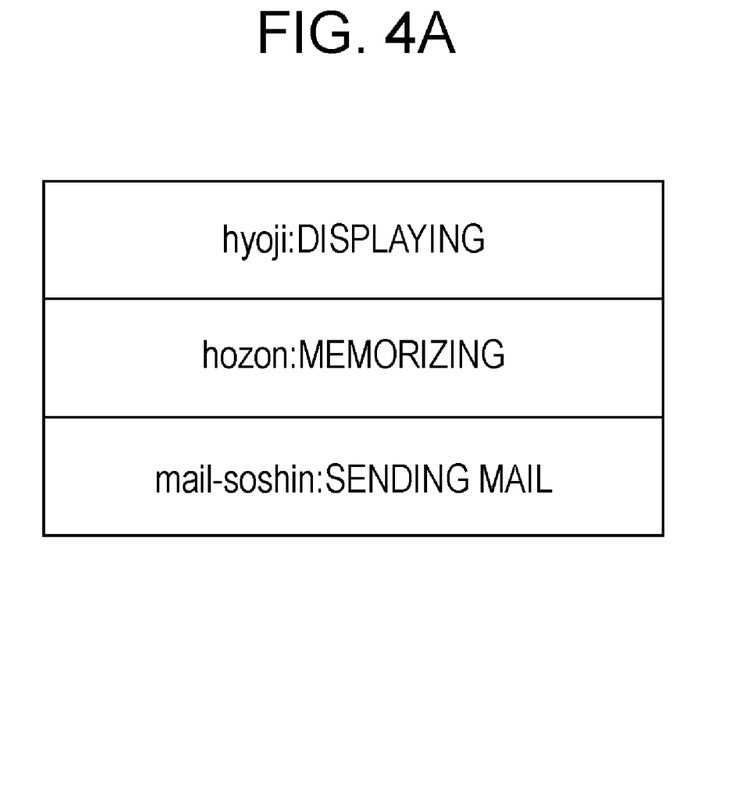
FIG. 4A shows an example of tags of a large-quantity special code according to the first embodiment.
Figure 4B:
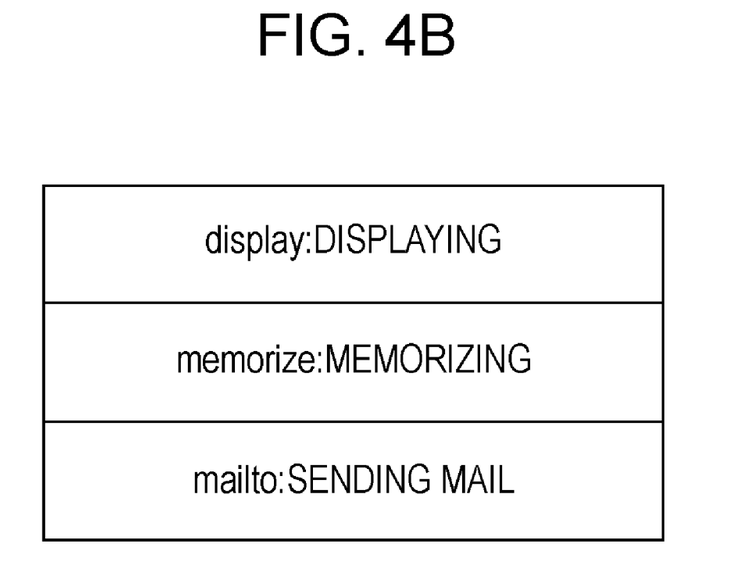
FIG. 4B shows an example of tags of a small-quantity general code according to the first embodiment.

The definitions of the terms "decoding" and "encoding" in the first embodiment will now be described with reference to FIGS. 4A and 4B. FIG. 4A shows an example of tags of the large-quantity special code, and FIG. 4B shows an example of tags of the small-quantity general code.

Whether the large-quantity special code or the small-quantity general code is used, original information is converted to instruction information in tag format, and the instruction information in tag format is encoded to form an image.

For example, original information, "display ???? on an operation screen", is converted to instruction information in tag format, "hyoji:???". Then, the instruction information in tag format is encoded to form an image including the large-quantity special code.

In the first embodiment, processing including "converting certain information to instruction information in tag format and then encoding the instruction information in tag format to form an image" is defined as encoding. Furthermore, processing including "converting a code, for example, the large-quantity special code or the small-quantity general code, to instruction information in tag format and then converting the instruction information in tag format to the original information" is defined as decoding. The terms "decoding" and "encoding" in the following description should be construed as defined above.

In step S1004, the original image formed in step S1001, the decoded information obtained in step S1003, and the location information detected in step S1002, which is the information regarding the location of the region occupied by the large-quantity special code in the original document, are stored in a memory of the MFP 803.

In step S1005, the CPU determines whether the MFP 803 has accepted the user selection of "mode in which a large-quantity special code is converted to a small-quantity general code" before the acceptance of the user selection of the start button or not. When the MFP 803 has not accepted the user selection of "mode in which a large-quantity special code is converted to a small-quantity general code" (NO in step S1005), the CPU proceeds to step S1006 to perform a process on the basis of the decoded information. For example, when the decoded information indicates "display ???? on an operation screen", the MFP 803 displays "????" on the operation screen in step S1006.

In contrast, when the MFP 803 has accepted the user selection of "mode in which a large-quantity special code is converted to a small-quantity general code" (YES in step S1005), the CPU proceeds to step S1008.

In step S1008, under the assumption that the decoded information stored in the memory of the MFP 803 is converted to a small-quantity general code, the CPU determines whether the quantity of the small-quantity general code is within the capacity of the region occupied by the large-quantity special code in the original document or not.

More specifically, in step S1008, the CPU determines how large a capacity of information the above-described region of the original document has for the small-quantity general code when the region is occupied by the small-quantity general code ((1)). Furthermore, the decoded information is converted to instruction information in tag format for the small-quantity general code ((2)). Then, the capacity of information determined in (1) is compared with the quantity of the instruction information in tag format obtained in (2).

As a result of the comparison, when the quantity of the instruction information in tag format obtained in (2) is smaller than or equal to the capacity of information determined in (1), the CPU determines that the decoded information can be accommodated within the above-described region of the original document. When the quantity of the instruction information in tag format obtained in (2) is larger than the capacity of information determined in (1), the CPU determines that the decoded information cannot be accommodated within the above-described region of the original document.

The relationship between quantities of information and areas occupied by the small-quantity general code in a case where the information is converted to the small-quantity general code is stored in the memory of the MFP 803. In step S1008, by using the stored relationship, the CPU determines how large a capacity of information the above-described region of the original document has for the small-quantity general code when the region is occupied by the small-quantity general code.

In step S1008, when the CPU determines that the quantity of the small-quantity general code is within the capacity of the region of the original document (YES in step S1008), the CPU proceeds to step S1010. In step S1010, the decoded information is encoded to form the small-quantity general code such that the small-quantity general code can be accommodated within the region of the original document.

For example, in step S1010, the decoded information, "display ???? on an operation screen", is converted to the instruction information in tag format, "display:????", and then the instruction information is encoded to an image. The CPU then proceeds to step S1012.

In contrast, in step S1008, when the CPU determines that the quantity of the small-quantity general code is not within the capacity of the region of the original document (NO in step S1008), the CPU proceeds to step S1009.

In step S1009, the CPU transfers the decoded information and a storage instruction to the server, so that the decoded information is stored in the server. The CPU receives information that the decoded information has been stored in the server and information regarding a link to the location in the server where the decoded information is stored (storage location), and proceeds to step S1011.

In step S1011, the CPU encodes the information regarding the link to the storage location to form a small-quantity general code such that the small-quantity general code can be accommodated within the region of the original document. More specifically, the decoded information is converted to the instruction information in tag format, "display: 'a link to the storage location'", using the information regarding the link to the storage location, and then the instruction information in tag format is encoded to form an image.

In step S1011, when the quantity of the small-quantity general code, which is formed by encoding the decoded information using the information regarding the link to the storage location, is over the capacity of the region of the original document, the MFP 803 displays a warning message on the operation screen.

In step S1012, the MFP 803 changes the region occupied by the large-quantity special code included in the original image stored in the memory of the MFP 803 to a blank region in the original document. After that, the MFP 803 places the small-quantity general code in the region, and prints out the resulting image on a sheet.

In other words, in step S1012, the MFP 803 replaces the large-quantity special code in the original image with the small-quantity general code, and prints out the resulting image on the sheet.

Accordingly, in the first embodiment, since the small-quantity general code is placed in the region that was originally occupied by the large-quantity special code, the image placed outside the region having been occupied by the large-quantity special code and the small-quantity general code do not overlap each other. For example, the image placed outside the region having been occupied by the large-quantity special code is the "A" shown in FIG. 1 in the first embodiment.

Since the image placed outside the region having been occupied by the large-quantity special code in the original document and the small-quantity general code are arranged such that they do not overlap each other, the readability of the information provided in the region outside the region having been occupied by the large-quantity special code is not reduced. In addition, the small-quantity general code can be accurately decoded later.

Second Embodiment

Figure 3:
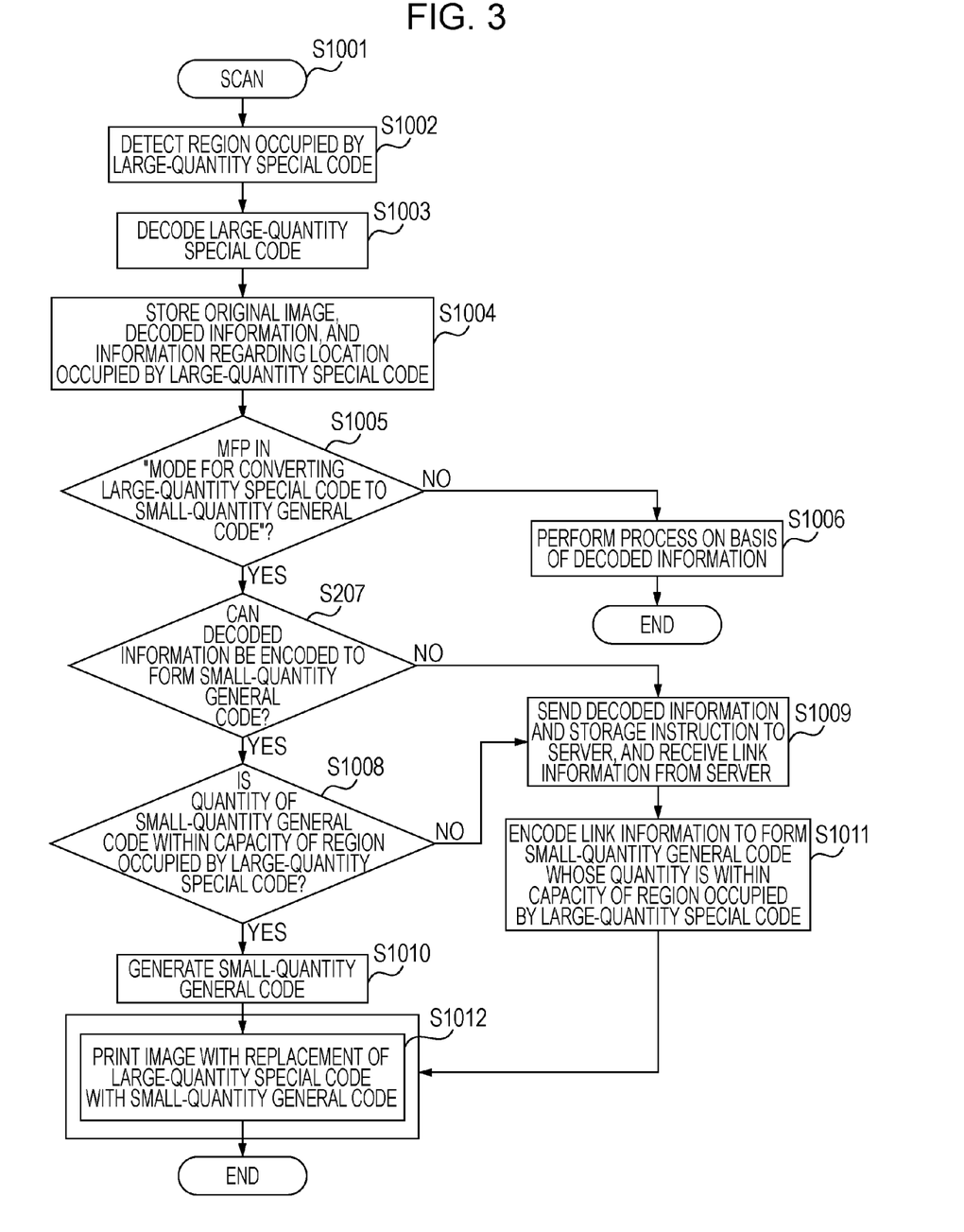
FIG. 3 is a flowchart according to a second embodiment of the present invention.

Flowchart According to Second Embodiment (FIG. 3)

The second embodiment will be described below with reference to FIG. 3. The second embodiment includes a countermeasure to a case in which decoded information cannot be encoded to form a small-quantity general code.

Figure 5A:
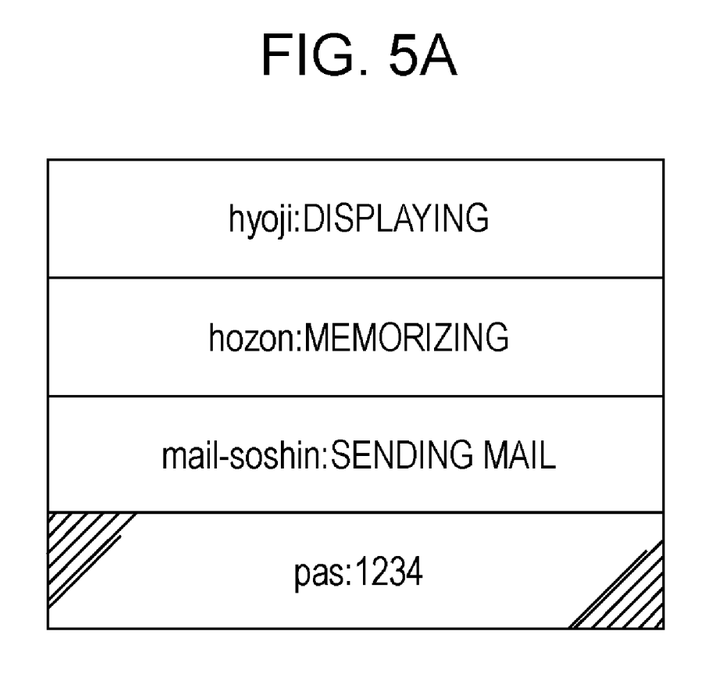
FIG. 5A shows an example of tags of a large-quantity special code according to the second embodiment.
Figure 5B:
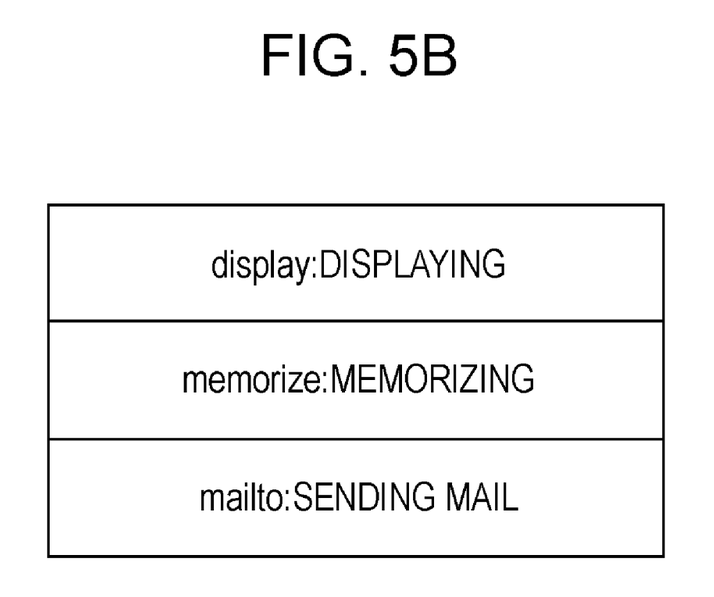
FIG. 5B shows an example of tags of a small-quantity general code according to the second embodiment.

More specifically, for example, it is assumed that a small-quantity general code does not include a tag specifying a password, as shown in FIG. 5B, while a large-quantity special code includes a tag specifying a password, as shown in FIG. 5A. Even if decoded information, which is information obtained by decoding the large-quantity special code, includes information, "set a password, 1234", the CPU cannot encode the information to form the small-quantity general code.

As a description of the second embodiment with reference to FIG. 3, only a process which is not included in the processes shown in FIG. 2, i.e., a process in step S207 performed for the shaded region in FIG. 5A will now be described.

In step S207, the CPU determines, on the basis of the type of the decoded information, whether decoded information, which is obtained in step S1004, can be encoded to form a small-quantity general code. In other words, the CPU determines whether the information included in the decoded information can be encoded to form the small-quantity general code using tags for the small-quantity general code. It is determined whether tags necessary for the encoding from the decoded information to form the small-quantity general code are included in the tags for the small-quantity general code.

In step S207, when the CPU determines that the decoded information cannot be encoded to form the small-quantity general code (NO in step S207), the CPU proceeds to step S1009. When the CPU determines that the decoded information can be encoded to form the small-quantity general code in step S207 (YES in step S207), the CPU proceeds to step S1008.

As described above, in the second embodiment, when the decoded information cannot be encoded to form the small-quantity general code, the decoded information is stored in the server. This prevents an error.

Other Embodiments

In the above-described embodiments, the descriptions have been made in the case where both the large-quantity special code and the small-quantity general code are two-dimensional codes. However, a large-quantity special code and a small-quantity general code in an embodiment of the present invention are not limited to a two-dimensional code, and may, for example, be a one-dimensional code, a digital watermark, or a steganographic image.

Additionally, although the descriptions have been made in the case where a medium in which data is stored is a memory in the embodiments, any medium in which data can be stored, such as a hard disk drive (HDD) or a random access memory (RAM), can be used instead of the memory.

Although the descriptions have been made in the case where the MFP 803 scans the original document in the embodiments, an alternative may be optical reading of an image on an original document instead of scanning, for example, photography with a digital camera.

The MFP 803, which can perform any of reading an image, processing data, and printing an image on a sheet, has been used in the descriptions of the embodiments. However, separate apparatuses, for example, an apparatus for reading an image, an apparatus for processing data, and an apparatus for printing an image on a sheet, may be used.

Herein, an apparatus capable of at least processing data is referred to as an image processing apparatus. Additionally, an apparatus capable of at least processing data and printing an image on a sheet is referred to as an image forming apparatus.

A storage medium according to an embodiment of the present invention may store program code for realizing the method illustrated in the flowchart described in each of the embodiments, and a computer may read and execute the program code. In this case, the program code itself, which is read from the storage medium, realizes the functions of each of the embodiments. Thus, the present invention can provide the program or the storage medium storing the program code.

Examples of the storage medium for providing the program code include floppy disks, hard disks, optical disks, magneto-optical disks, compact discs read-only memory (CD-ROMs), compact discs recordable (CD-Rs), magnetic tapes, nonvolatile memory cards, read-only memories (ROMs).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-343432 filed Dec. 20, 2006, which is hereby incorporated by reference herein in its entirety.

What is claimed is:

1. An image processing apparatus comprising:
    a decoding unit for obtaining information by decoding a first type of code in an image, the image being obtained by reading a sheet including the first type of code;
    a transmitting unit for transmitting, to a server, an instruction for storing the information obtained by the decoding unit; and
    an encoding unit for generating a second type of code using information regarding a location in which the information is stored, the second type of code being different from the first type of code, the information regarding the location being transmitted from the server.

2. An image processing apparatus comprising:
- a decoding unit for obtaining information by decoding a first type of code in an image, the image being obtained by reading a sheet including the first type of code; and
- a determining unit for determining which of a first process and a second process is to be performed based on the type of the information obtained by the decoding unit,
- wherein the first process is a process of transmitting, to a server, an instruction for storing the information obtained by the decoding unit, and of generating a second type of code using information regarding a location in which the information is stored, the second type of code being different from the first type of code, the information regarding the location being transmitted from the server, and
- wherein the second process is a process of generating a second type of code by encoding the information obtained by the decoding unit, the second type of code being different from the first type of code.

3. An image processing apparatus comprising:
- a decoding unit for obtaining information by decoding a first type of code in an image, the image being obtained by reading a sheet including the first type of code; and
- a determining unit for determining which of a first process and a second process is to be performed based on the quantity of the information obtained by the decoding unit,
- wherein the first process is a process of transmitting, to a server, an instruction for storing the information obtained by the decoding unit, and of generating a second type of code using information regarding a location in which the information is stored, the second type of code being different from the first type of code, the information regarding the location being transmitted from the server, and
- wherein the second process is a process of generating a second type of code by encoding the information obtained by the decoding unit, the second type of code being different from the first type of code.

4. A method for controlling an image processing apparatus, the method comprising:
- a decoding step of obtaining information by decoding a first type of code in an image, the image being obtained by reading a sheet including the first type of code;
- a transmitting step of transmitting, to a server, an instruction for storing the information obtained in the decoding step; and
- an encoding step of generating a second type of code using information regarding a location in which the information is stored, the second type of code being different from the first type of code, the information regarding the location being transmitted from the server.

5. A computer-readable storage medium having stored thereon a program for causing a computer to perform each of the steps included in the method for controlling an image processing apparatus according to claim 4.

6. A method for controlling an image processing apparatus, the method comprising:
- a decoding step of obtaining information by decoding a first type of code in an image, the image being obtained by reading a sheet including the first type of code; and
- a determining step of determining which of a first process and a second process is to be performed based on the type of the information obtained in the decoding step,
- wherein the first process is a process of transmitting, to a server, an instruction for storing the information obtained in the decoding step, and of generating a second type of code using information regarding a location in which the information is stored, the second type of code being different from the first type of code, the information regarding the location being transmitted from the server, and
- wherein the second process is a process of generating a second type of code by encoding the information obtained in the decoding step, the second type of code being different from the first type of code.

7. A computer-readable storage medium having stored thereon a program for causing a computer to perform each of the steps included in the method for controlling an image processing apparatus according to claim 6.

8. A method for controlling an image processing apparatus, the method comprising:
- a decoding step of obtaining information by decoding a first type of code in an image, the image being obtained by reading a sheet including the first type of code; and
- a determining step of determining which of a first process and a second process is to be performed based on the quantity of the information obtained in the decoding step,
- wherein the first process is a process of transmitting, to a server, an instruction for storing the information obtained in the decoding step, and of generating a second type of code using information regarding a location in which the information is stored, the second type of code being different from the first type of code, the information regarding the location being transmitted from the server, and
- wherein the second process is a process of generating a second type of code by encoding the information obtained in the decoding step, the second type of code being different from the first type of code.

9. A computer-readable storage medium having stored thereon a program for causing a computer to perform each of the steps included in the method for controlling an image processing apparatus according to claim 8.

* * * * *

UNITED STATES PATENT AND TRADEMARK OFFICE
CERTIFICATE OF CORRECTION

| | |
|---|---|
| PATENT NO. | : 7,681,797 B2 |
| APPLICATION NO. | : 11/871836 |
| DATED | : March 23, 2010 |
| INVENTOR(S) | : Ayako Nishizawa |

It is certified that error appears in the above-identified patent and that said Letters Patent is hereby corrected as shown below:

On title page, item (30) Foreign Application Priority Data should read as follows:

Dec. 20, 2006 (JP) ...................... 2006-343432

Signed and Sealed this

Twenty-second Day of June, 2010

David J. Kappos
*Director of the United States Patent and Trademark Office*